(12) United States Patent
Gershenson

(10) Patent No.: US 7,813,529 B1
(45) Date of Patent: Oct. 12, 2010

(54) OPTICAL 3-D SURFACE TOMOGRAPHY USING DEPTH FROM FOCUS OF PARTIALLY OVERLAPPING 2-D IMAGES

(75) Inventor: Meir Gershenson, Panama City, FL (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 992 days.

(21) Appl. No.: 11/645,269

(22) Filed: Nov. 24, 2006

(51) Int. Cl.
*G06K 9/00* (2006.01)
*G01C 3/08* (2006.01)

(52) U.S. Cl. .................. 382/106; 382/154; 356/4.04; 702/5

(58) Field of Classification Search ............. 382/106, 382/154, 284; 356/3.13, 12; 702/5
See application file for complete search history.

(56) References Cited

U.S. PATENT DOCUMENTS

| | | | | |
|---|---|---|---|---|
| 5,023,641 | A * | 6/1991 | Merrick | 396/88 |
| 5,270,756 | A * | 12/1993 | Busenberg | 348/144 |
| 5,473,364 | A * | 12/1995 | Burt | 348/47 |
| 6,937,321 | B2 * | 8/2005 | Tanabata et al. | 356/4.04 |
| 2003/0235344 | A1 * | 12/2003 | Kang et al. | 382/284 |
| 2005/0286800 | A1 * | 12/2005 | Gouch | 382/284 |

OTHER PUBLICATIONS

Subbarao et al. (Dec. 1997) "Integration of defocus and focus analysis with stereo for 3d shape recovery." SPIE vol. 3204, pp. 11-23.*
Darrell et al. (Jun. 1988) "Pyramid-based depth from focus." Proc. 1988 Comp. Soc. Conf. on Computer Vision and Pattern Recognition, pp. 504-509.*
Pentland, A.P. (Jul. 1987) "A new sense for depth of field." IEEE Trans. on Pattern Analysis and Machine Intelligence, vol. 9 No. 4, pp. 523-531.*
Xiong et al. (Jun. 1993) "Depth from focusing and defocusing." Proc. 1993 IEEE Comp. Soc. Conf. on Computer Vision and Pattern Recognition, pp. 68-73.*

* cited by examiner

*Primary Examiner*—Brian P Werner
*Assistant Examiner*—Barry Drennan

(57) ABSTRACT

A system and method of reconstructing a three-dimensional image of an object is provided. The system includes a single camera including a pinhole lens and having a surface defining an image plane. The single camera can be arranged to move along a linear path relative to the object and is configured to capture images at predetermined locations along the linear path such that at least a portion of the captured adjacent images overlap. The system includes a processor that can be programmed with an image processing logic that enables the processor to create a three-dimensional image of the object.

6 Claims, 5 Drawing Sheets

OPTICAL 3-D SURFACE TOMOGRAPHY USING DEPTH FROM FOCUS OF PARTIALLY OVERLAPPING 2-D IMAGES

STATEMENT OF GOVERNMENT INTEREST

The present teachings described herein may be manufactured and used by or for the Government of the United States of America for Governmental purposes without the payment of any royalties thereon or therefor.

FIELD OF THE INVENTION

The present teachings relate to a system and method for performing optical surface tomography. In particular, the present teachings relate to a system and method for performing optical surface tomography which provides high-quality images in low visibility conditions by processing a sequence of images taken from various locations by a single camera.

BACKGROUND OF THE INVENTION

Three-dimensional (3-D) sensing and imaging has been the subject of research due to its diverse benefits and applications. Some exemplary applications of 3-D imaging include mapping and computer visualization. Presently, 3-D information for purposes of mapping and computer visualization is obtained using photogrammetry. Photogrammetry is based on comparing two or more photographic images taken by one or more cameras from different positions with respect to an object being mapped. Common points are then identified on each image and a line-of-sight, or ray, is constructed from the camera location to the identified points on the object. The 3-D image and the range of the object can be determined using the intersection of these rays through the use of triangulation. Photogrammetry, however, does not allow for the generation of images in poor visibility environments, such as turbid environments. Instead, in poor visibility environments, a 3-D image can be obtained using time-gated imaging or laser scanning methods. However, these methods require expensive, specialized equipment that uses a specialized light source thereby limiting their practical range, especially in daylight conditions.

Computer-aided tomography (CAT) can also provide 3-D images. CAT is an imaging method that employs tomography in which digital geometry processing is used to generate a 3-D image of the internals of an object from a large series of two-dimensional X-ray images taken around a single axis of rotation. Although optical CAT is capable of providing high-resolution 3-D images of convex objects, its capability is limited with respect to occlusions and concave objects.

Accordingly, a need exists for a system and method that can efficiently provide 3-D imaging of various-shaped objects in all types of environmental conditions.

SUMMARY OF THE INVENTION

The present teachings disclose a system and method of reconstructing a 3-D image of an object using a single camera.

According to the present teachings, the system includes a single camera including a pinhole lens and having a surface defining an image plane. The single camera is positionable at a distance away from a surface of an object to be imaged and is moveable along a linear path relative to the object. The single camera is configured to capture a volume spot projected into the camera to create a single pixel and to create a sequence of images, whereby at least adjacent captured images in the sequence partially overlap. Moreover, the system includes a processor programmed with an image processing logic that enables the processor to create a 3-D image of the object.

According to the present teachings, the method includes capturing an image at each of a plurality of predetermined locations along a linear path by way of a single camera and creating a sequence of images, whereby at least adjacent captured images in the sequence partially overlap. The method also includes mapping the plurality of images to create a 3-D image of the object.

Additional features and advantages of various embodiments will be set forth, in part, in the description that follows, and, in part, will be apparent from the description, or may be learned by practice of various embodiments. The objectives and other advantages of various embodiments will be realized and attained by means of the elements and combinations particularly pointed out in the description herein.

It is to be understood that both the foregoing general description and the following detailed description are exemplary and explanatory only, and are only intended to provide an explanation of various embodiments of the present teachings.

DETAILED DESCRIPTION OF THE PREFERRED EMBODIMENTS

Figure 1:
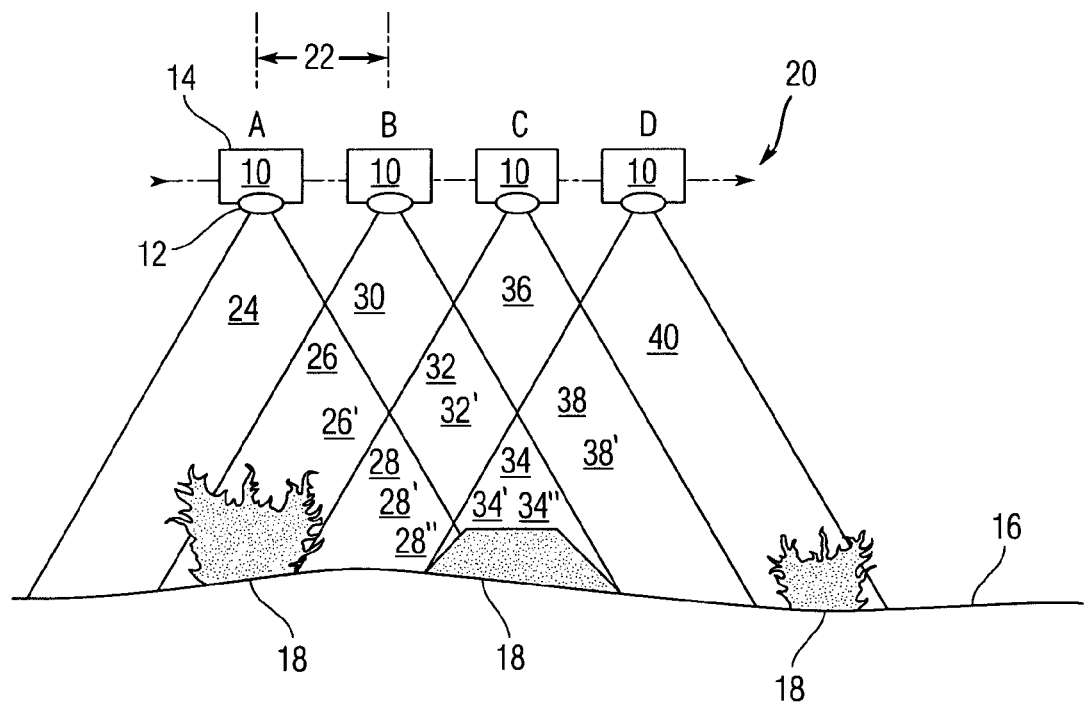
FIG. 1 shows a schematic representation of a three-dimensional image reconstruction system according to various embodiments.

The present teachings are directed to a system and method for reconstructing a 3-D image of an object. As shown in FIG. 1, the system of the present teachings includes a single camera 10 including a pinhole lens 12 and a surface defining an image plane 14. The single camera 10 can be any type of camera, such as a digital camera, a CCD camera, and the like.

The single camera 10 is positionable at a distance away from a surface 16 having the objects 18 to be imaged and is capable of moving along a linear path 20 relative to the objects 18. The single camera 10 is configured to capture an image at predetermined locations A, B, C, and D along the linear path 20 to thereby create a sequence of images. The movement of the single camera 10 along the linear path 20 can be accomplished by placing the single camera 10 on a track having a linearly moving device, or in any other manner as would be appreciated by one of ordinary skill in the art. The single camera 10 can be arranged to move continuously or non-continuously along the linear path 20 relative to the objects 18.

Predetermined locations A, B, C, and D along the linear path 20 are separated from one another by a distance 22. The distance 22 can be a length that is pre-selected such that at least a portion of each of the adjacent captured images in the sequence captured by the single camera 10 overlap one another. For example, the moving single camera 10 at location A can capture an image that includes volumes 24, 26, and 28. When the moving single camera 10 reaches location B, it captures an image that includes volumes 26', 28', 30, 32, and 34. As the single camera 10 moves further along the linear path 20 to location C, it captures an image that includes volumes 28", 32', 34', 36, and 38. Similarly, when the moving single camera 10 reaches location D, it captures an image that includes volumes 34", 38', and 40. As a result, the volumes 26 and 26' are an image of the same volume captured at two different angles due to the movement of the camera along the linear path 20. Similarly, each of the volumes in each of the other four different volume sets (i) 28, 28', 28"'; (ii) 32, 32'; (iii) 34, 34', 34"; and (iv) 38, 38', are an image of the same volume captured at different angles due to the movement of the single camera 10 along the linear path 20. Accordingly, the images captured at locations A, B, C, and D can produce a sequence of partially overlapping images.

The sequence of overlapping images can then be stored in a storage device. An image processing logic can then be used to retrieve the sequence of overlapping images from the storage device and create or reconstruct a 3-D image of the objects 18. As would be appreciated by one of ordinary skill in the art, the image processing logic can be programmed and run by a processor, such as one found in a general purpose computing device.

The image processing logic of the present teachings can include, for example, back-projection process logic or focal-plane projection process logic. Back-projection process logic and focal-plane projection process logic can utilize the attenuation data of the images captured from different angles corresponding to locations A, B, C, and D, for example.

Figure 2:
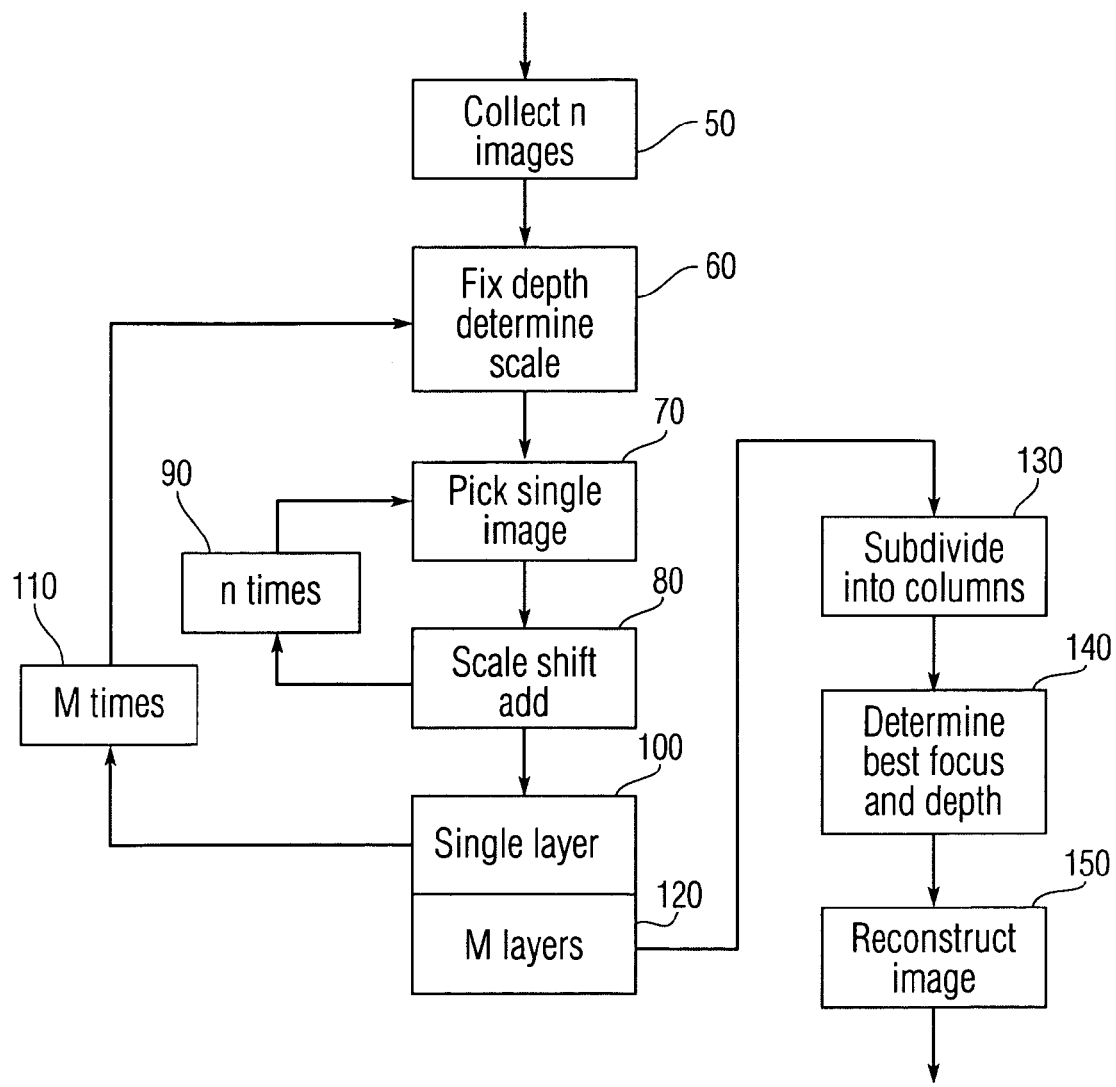
FIG. 2 is a flow diagram showing the process of reconstructing a three-dimensional image of an object according to various embodiments.
Figure 3:
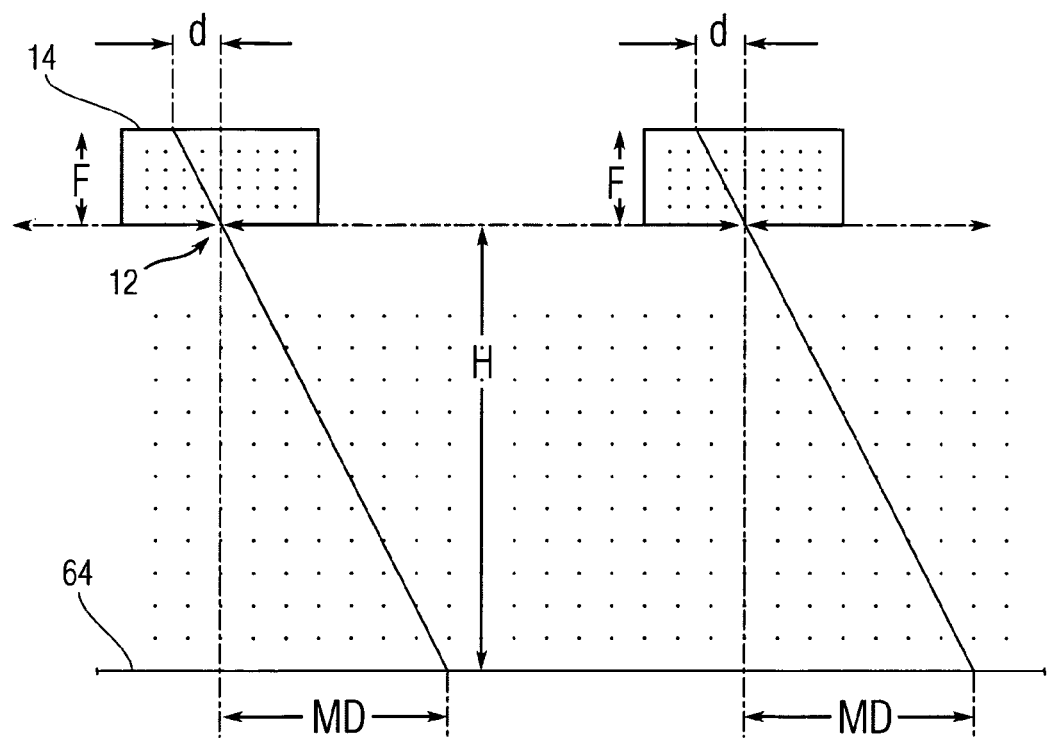
FIG. 3 shows a schematic representation of a camera of the three-dimensional image reconstruction system that is projecting an image on a surface according to various embodiments.

An example of back-projection process logic is shown in FIG. 2. At step 50, images captured by the single camera 10 at locations A, B, C, and D can be collected or retrieved from a storage device. At step 60, a depth H is selected and a scale factor M (i.e., a magnification factor) is determined at the selected depth H. Preferably, the depth H is measured from the pinhole lens 12 of a camera, see FIG. 3. Additionally, it is preferable that at the depth H at least a portion of the image of the object captured by the single camera 10 is in focus. The scale factor M is the ratio of the depth H to a distance F (i.e. M=H/F), wherein the distance F is the distance from the pinhole lens 12 to the image plane 14. Accordingly, the size of an inversed mapped image MD can be determined by the following equation:

$$MD = d*(H/F)$$

where d is the size of the image on the image plane 14.

At step 70, a layer of a single image captured at location A, which corresponds to the selected depth H and scale factor M from step 60, can be selected. At step 80, a shift factor of zero is added to the selected layer because in this example the single camera 10 at location A is stationary. At step 90, the process at steps 70 and 80 are repeated for each of locations B, C, and D at which the single camera 10 has captured an image. However, given that the single camera 10 is not stationary at locations B, C, and D, the shift factor added at step 80 for each of the selected images at locations B, C, and D is non-zero. Accordingly, when the process is repeated at step 90 for an image captured at location B, at step 70 a layer of a single image at the depth H and scale factor M can be selected. At step 80, a shift factor corresponding to the movement of the single camera 10 from location A to location B is added to the selected layer of the image captured at location B.

Similarly, for the image captured at location C, a layer of a single image at the depth H and scale factor M can be selected. At step 80, a shift factor corresponding to the movement of the single camera 10 from location B to location C is added to the selected layer of the image captured at location C. For the image captured at location D, a layer of a single image at the depth H and scale factor M can be selected. At step 80, a shift factor corresponding to the movement of the single camera 10 from location C to location D is added to the selected layer of the image captured at location D. Although, in this exemplary embodiment, the process involving steps 70 and 80 is repeated four times (once for each of locations A, B, C, and D), one of ordinary skill in the art would appreciate that this process could be repeated as many times as necessary and for each location at which the single camera 10 captures an image.

At step 100, each of the single layers at the depth H and the scale factor M at locations A, B, C, and D are then collected and can be inversely projected through the pinhole lens 12 and onto a reconstruction image plane 64 to create a single layer of an inversely mapped image of the object.

Each of the images which create the single layer of the inversely mapped image at step 100 provides different information about the 3-D object. However, in order to form a 3-D image of the object, multiple layers of the object should be created. To create the multiple layers, the entire process from step 60 to step 100 may be repeated as many times as necessary by selecting a new depth H and determining a new scale factor M at the end of each cycle, as represented by step 110. Preferably, each of the selected new depths H corresponds to an image. For example, to create a second layer, a second depth H is selected and a scale factor M is determined at the second selected depth H. Steps 60 through 100 are then repeated, with steps 70 and 80 being repeated for each of locations A, B, C, and D, to create the second layer. To create a third layer, a third depth H is selected and a scale factor M is determined at the third selected depth H. Steps 60 through 100 are then repeated, with steps 70 and 80 being repeated for each of locations A, B, C, and D, to create the third layer. This process can continue until a sufficient number of a plurality of layers containing images at different depths H have been created. At step 120, the layers are then collected to create multi-layers of the captured images.

At step 130, the multi-layered image generated in step 120 is subdivided into columns. Each of the columns can include all of the depths of a relatively small image or a portion of a larger image. At step 140, the depth at which the image that is in focus in each of the columns is determined. Using the data of step 140 (the depth of the focused image in each of the individual columns), the 3-D image of the object can then be reconstructed.

Figure 4:
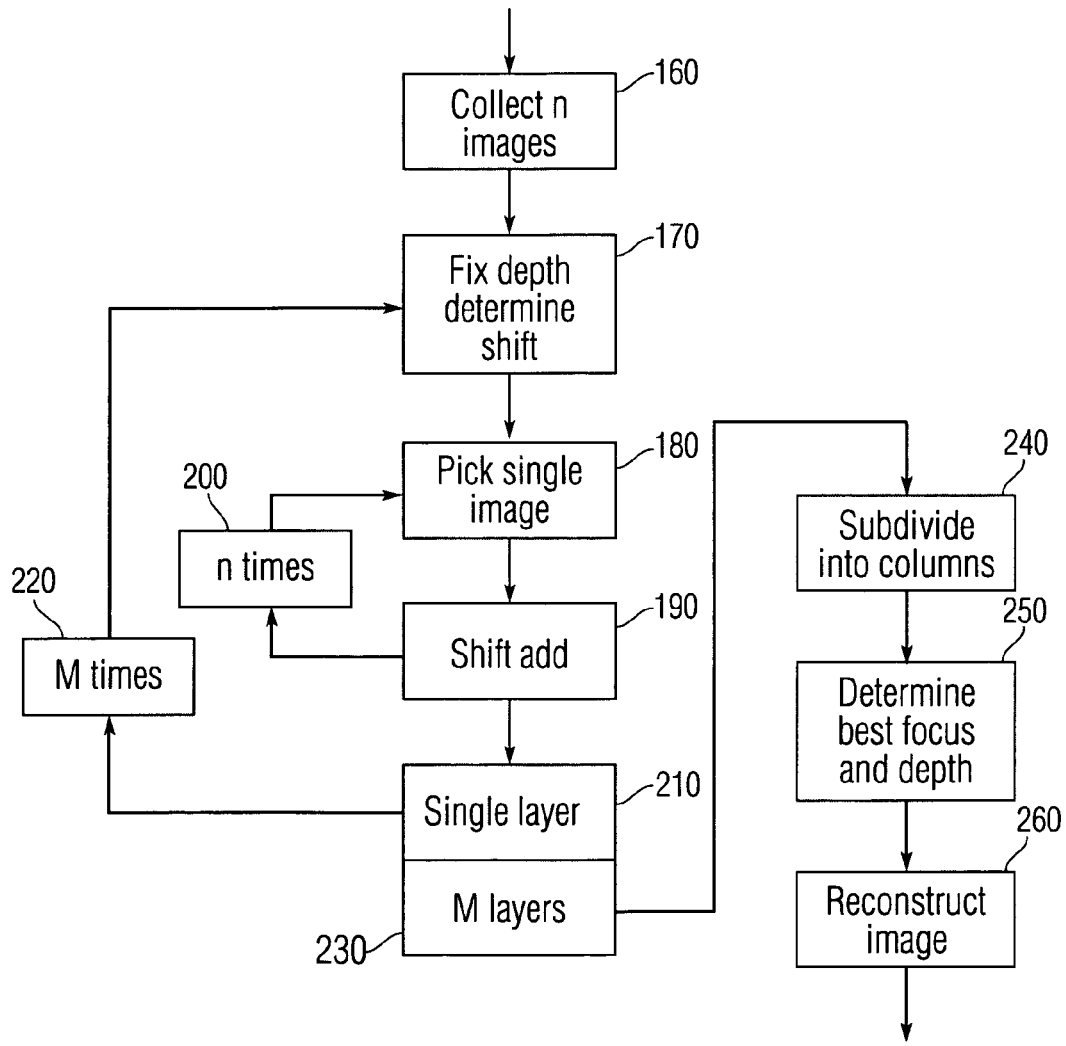
FIG. 4 is a flow diagram showing an alternative process for reconstructing a three-dimensional image of an object according to various embodiments.
Figure 5:
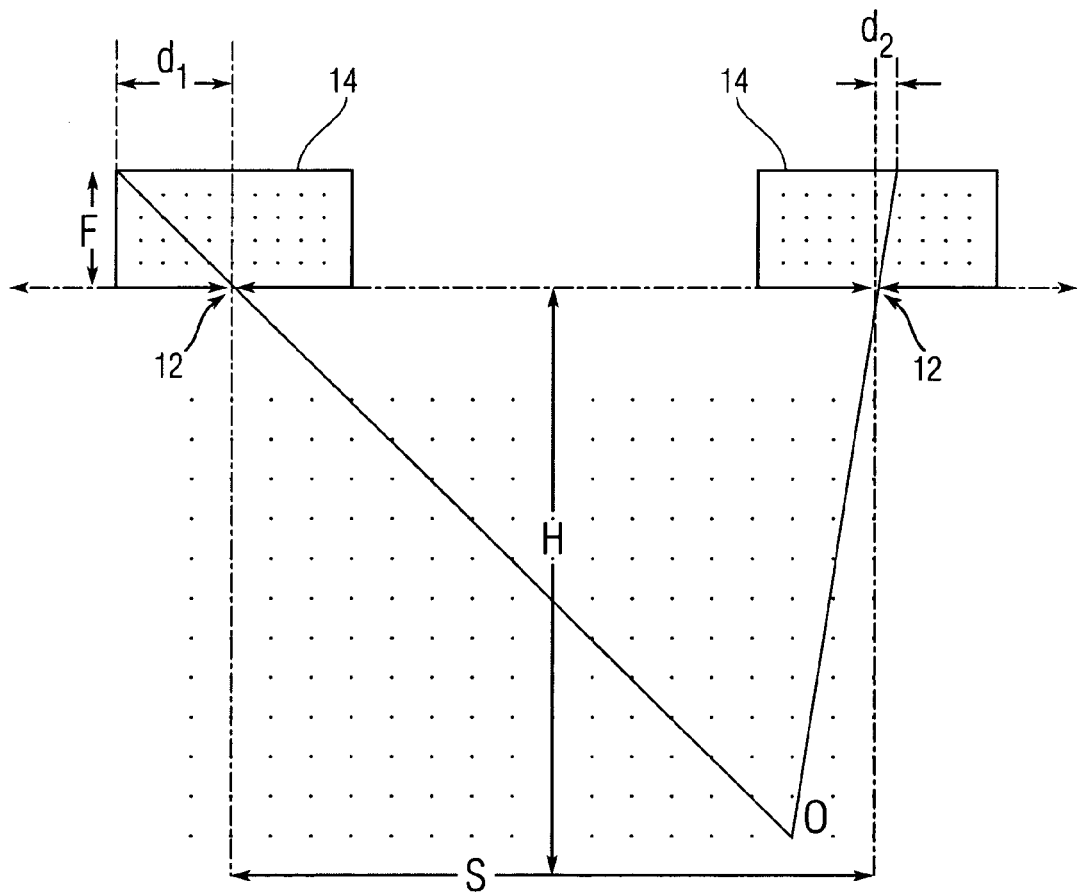
FIG. 5 shows a schematic representation of a camera of the three-dimensional image reconstruction system projecting an image on a surface defining an image plane according to various embodiments.

An example of focal-plane projection process logic is shown in FIG. 4. Process steps 160, 240, 250, and 260 of the focal-plane projection process logic are identical to process steps 50, 130, 140, and 150 respectively, of the back-projection process logic described above. Accordingly, at step 160 of the focal-plane process logic, the images captured by the single camera 10 at locations A, B, C, and D can be collected or retrieved from a storage device. At step 170, a depth H is selected and a shift correction factor, s, is determined at the selected depth H. Depth H in the focal-plane projection process logic is identical to the depth H in the back-projection process logic described above. However, given that in the focal-plane projection process logic the image is reconstructed on the image plane 14 of the moving single camera 10 (see FIG. 5), a captured image of the object on the image plane 14 appears as shifted from size $d_1$ (size of the image on the image plane 14 at location A) to size $d_2$ (the size of the image on the image plane 14 at location B). Accordingly, the shift correction factor s is the sum of $d_1$ and $d_2$, which can be defined by the following equation:

$$s=d_1+d_2=S*(F/H)$$

where S is the distance between each of locations A, B, C, and D; F is the distance from the pinhole lens 12 to the image plane 14; and H is the selected depth from pinhole lens 12.

At step 180, a layer of a single image captured at location A, which corresponds to the selected depth H and the shift correction factor s from step 170, can be selected. At step 190, a shift factor of zero is added to the selected layer because in this example the single camera 10 at location A is stationary. At step 200, the process at steps 180 and 190 are repeated for each of locations B, C, and D at which the single camera 10 has captured an image. However, given that the single camera 10 is not stationary at locations B, C, and D, the shift factor added at step 190 for each of the selected images at locations B, C, and D is non-zero. Accordingly, when the process is repeated at step 200 for an image captured at location B, at step 180 a layer of single image at the depth H and shift correction factor s can be selected. At step 190, a shift factor corresponding to the movement of the single camera 10 from location A to location B is added to the selected layer of the image captured at location B.

At step 200, steps 180 and 190 of the process are repeated for the images captured by the single camera 10 at locations C and D. Accordingly, for the image captured at location C, a layer of a single image at the depth H and shift correction factor s can be selected. At step 190, a shift factor corresponding to the movement of the single camera 10 from location B to location C is added to the selected layer of the image captured at location C. For the image captured at location D, a layer of a single image at the depth H and shift correction factor s can be selected. At step 190, a shift factor corresponding to the movement of the single camera 10 from location C to location D is added to the selected layer of the image captured at location D. Although, in this exemplary embodiment, the process involving steps 180 and 190 is repeated four times (once for each of locations A, B, C, and D), one of ordinary skill in the art would appreciate that this process could be repeated as many times as necessary and for each location at which the single camera 10 captures an image.

At step 210, each of the single layers at the depth H and the shift correction factor s at locations A, B, C, and D are then collected and projected onto the image plane 14 to create a single layer of mapped image of the object.

Each of the images which create the single layer of the mapped image at step 210 provides different information about the 3-D object. However, in order to form a 3-D image of the object, multiple layers of the object should be created. To create the multiple layers, the entire process from step 170 to step 210 may be repeated as many times as necessary by selecting a new depth H and determining a new shift correction factor s at the end of each cycle, as represented by step 220. Preferably, each of the selected new depths H corresponds to an image. For example, to create a second layer a second depth H is selected and a shift correction factor s is determined at the second selected depth H. Steps 170 through 210 are then repeated, with steps 180 and 190 being repeated for each of locations A, B, C, and D, to create the second layer. To create a third layer, a third depth H is selected and a shift correction factor s is determined at the third selected depth H.

Steps 170 through 210 are then repeated, with steps 180 and 190 being repeated for each of locations A, B, C, and D, to create the third layer. This process can continue until a sufficient number of a plurality of layers containing images at different depths H have been created. At step 230, the layers are then collected to create multi-layers of the captured images.

As stated above, steps 240, 250, and 260 of the focal-plane projection process logic are identical to the steps 130, 140, and 150 of the back-projection process logic, respectively. Therefore, as described above, the multi-layered image generated in step 230 is subdivided into columns and the depth at which the image is in focus in each of the columns is determined. The 3-D image of the object can then be reconstructed.

Those skilled in the art can appreciate from the foregoing description that the present teachings can be implemented in a variety of forms. Therefore, while these teachings have been described in connection with particular embodiments and examples thereof, the true scope of the present teachings should not be so limited. Various changes and modifications may be made without departing from the scope of the teachings herein.

What is claimed is:

1. A method for reconstructing a three-dimensional image of an object comprising:
   (a) capturing an image at each of a plurality of predetermined locations along a linear path by way of a single camera and creating a sequence of images, wherein at least adjacent captured images in the sequence partially overlap;
   (b) collecting the plurality of captured images;
   (c) selecting a depth and determining a scale of the captured images;
   (d) selecting a single image corresponding to the selected depth and determined scale;
   (e) shifting the selected single image by a predetermined distance;
   (f) repeating steps (d) and (e) for each of the predetermined locations in which an image was captured to create a single layer of the sequence of images;
   (g) repeating steps (c)-(f) at a new depth;
   (h) repeating step (g) to create a plurality of layers of the sequence of images;
   (i) subdividing the plurality of layers into a plurality of columns;
   (j) determining the depth at which at least a portion of the sequence of images is in focus in each of the plurality of columns; and
   (k) reconstructing the three-dimensional image.

2. The method of claim 1, wherein the depth selected at step (c) is a distance measured from a pinhole lens of the single camera.

3. The method of claim 1, wherein the scale determined at step (c) is determined by the equation: H/F, where H is the depth and F is the distance from the pinhole lens to an image plane of the camera.

4. A method for reconstructing a three-dimensional image of an object Comprising:
   (a) capturing an image at each of a plurality of predetermined locations along a linear path by way of a single camera and creating a sequence of images, wherein at least adjacent captured images in the sequence partially overlap;
   (b) collecting the plurality of captured images;
   (c) selecting a depth and determining a shift of the captured images;

(d) selecting a single image corresponding to the selected depth and determined shift;
(e) shifting the selected single image by a predetermined distance;
(f) repeating steps (d) and (e) for each of the predetermined locations in which an image was captured to create a single layer of the sequence of images;
(g) repeating steps (c)-(f) at a new depth; end
(h) repeating step (g) to create a plurality of layers of the sequence of images;
(i) subdividing the plurality of layers into a plurality of columns;
(j) determining the depth at which at least a portion of the sequence of images is in focus in each of the plurality of columns; and
(k) reconstructing the three-dimensional image.

5. The method of claim 4, wherein the depth selected at step (c) is a distance measured from a pinhole lens of the single camera.

6. The method of claim 4, wherein the shift determined at step (c) is determined by the equation:

$$S*(F/H)$$

where S is a distance between each of the plurality of predetermined locations along the linear path, F is the distance from the pinhole lens to an image plane of the single camera, and H is the depth.

* * * * *